(12) United States Patent
Itoi

(10) Patent No.: US 6,779,774 B2
(45) Date of Patent: Aug. 24, 2004

(54) METAL DIAPHRAGM VALVE

(75) Inventor: Shigeru Itoi, Osaka (JP)

(73) Assignee: Fujikin Incorporated, Osaka (JP)

( * ) Notice: Subject to any disclaimer, the term of this patent is extended or adjusted under 35 U.S.C. 154(b) by 89 days.

(21) Appl. No.: 10/296,150

(22) PCT Filed: Apr. 24, 2002

(86) PCT No.: PCT/JP02/04102
§ 371 (c)(1),
(2), (4) Date: Jan. 28, 2004

(87) PCT Pub. No.: WO03/091611
PCT Pub. Date: Nov. 6, 2003

(65) Prior Publication Data
US 2004/0094740 A1 May 20, 2004

(51) Int. Cl.[7] ............. F16K 31/143; F16K 31/163; F16K 31/363; F16K 31/383
(52) U.S. Cl. ............................................. 251/63.6
(58) Field of Search ................. 251/62, 63.5, 63.6, 251/331

(56) References Cited

U.S. PATENT DOCUMENTS

| | | | | |
|---|---|---|---|---|
| 4,867,201 A | * | 9/1989 | Carten | 137/625.18 |
| 4,917,357 A | * | 4/1990 | Danko | 251/331 |
| 5,108,069 A | * | 4/1992 | Tada et al. | 251/58 |

* cited by examiner

Primary Examiner—Edward K. Look
Assistant Examiner—John K. Fristoe, Jr.
(74) Attorney, Agent, or Firm—Griffin & Szipl, P.C.

(57) ABSTRACT

A metal diaphragm valve for use inter alia in semiconductor facilities. This metal diaphragm valve is so designed as to reduce the fluid resistance of the fluid path from the valve chamber to the outflow path of the body and allows a large quantity of fluid to flow in spite of its small size.

The metal diaphragm valve of the present invention comprises a body 2 provided with an inflow path 6, a valve chamber 8 and an outflow path 7 and a metal diaphragm 3, driving means 4 and a ring-shaped groove 5, wherein the diameter D of the inflow path 6 is larger than the width W of the ring-shaped groove 5 and the effective cross-sectional area of the regions where the ring-shaped groove 5 and the effective cross-sectional area of the regions where the ring-shaped groove 5 and the outflow path 7 intersect one another is larger than the transverse cross-sectional area of the outflow path 7.

6 Claims, 3 Drawing Sheets

METAL DIAPHRAGM VALVE

FIELD OF THE INVENTION

The present invention relates to improvements in metal diaphragm valves for use in semiconductor manufacturing apparatus and others.

BACKGROUND OF THE INVENTION

A diaphragm valve of this type is known from unexamined Japanese patent application laid-open under No. 8-105554, for example.

As shown in FIGS. 4 and 5, the metal diaphragm valve 20 comprises a body 25 having a valve seat 24 at a bottom face of a valve chamber 23 communicating with an inflow path 21 and an outflow path 22, a metal diaphragm 26 having an upwardly bending central region and being provided in said body 25 in such a manner that the valve chamber 23 is sealed in an airtight fashion, driving means 27 that are operable to press the metal diaphragm 26 against valve seat 24 and to allow the metal diaphragm 26 to return elastically to its original shape and move away from valve seat 24 and a ring-shaped groove 28 that is formed under the valve chamber 23 in communication with said outflow path 22.

Owing to said ring-shaped groove 28 the metal diaphragm valve 20 shown FIGS. 4 and 5 can allow a large quantity of fluid to flow without needing to increase the diameter of the valve seat 24 or to raise the metal diaphragm from the seat 24 so greatly. In other words, as compared to valves without a ring-shaped groove 28, the metal diaphragm valve 20 has an increased Cv value. It is noted that Cv indicates the ease with which fluid is allowed to flow through the valve.

However, while the prior art metal diaphragm valve 20 has the ring-shaped groove 28 communicating with the outflow path 22, the diameter $D_1$ of the outflow path 22, particularly the diameter of the vertical portion of the outflow path 22 near the bottom of the ring-shaped groove 28, is smaller than the width of the ring-shaped groove 28, such that the flow of fluid is squeezed, increasing the flow resistance. Hence, the flow channel as a whole, running from the valve chamber 23 to the outflow path 22 does not allow fluid to flow at a great flow rate. That is, the Cv value cannot be increased further.

The prior art metal diaphragm valve 20 has another problem. To increase the cross-sectional area of the flow path, two vertical holes 22a, 22b are first bored side by side and then the inside walls are smoothed. But this method of processing outflow path 22 is labour intensive.

Furthermore, because the horizontal width $W_1$ at the bottom of the ring-shaped groove 28 is larger than the horizontal diameter $D_1$ at the top of the outflow path 22, a squeezing phenomenon occurs and the flow path resistance tends to increase.

SUMMARY OF THE INVENTION

The present invention has been made in view of the above problems, and it is an object of the present invention to provide a metal diaphragm valve that allows a large quantity of fluid to flow from the valve chamber to the outflow path without difficulty.

The metal diaphragm valve of the present invention comprises a body provided with a valve seat at a bottom face of a valve chamber communicating with an inflow path and an outflow path, a metal diaphragm having an upwardly-bending central region which is provided in the body in such a way that the valve chamber 23 is kept airtight, driving means for allowing the metal diaphragm to rest on the valve seat and for allowing the metal diaphragm to return elastically to its original shape and move away from the valve seat and a ring-shaped groove formed under the valve chamber and communicating with the outflow path, wherein the diameter of the outflow path is made larger than the width of the ring-shaped groove, and the effective cross-sectional area of the regions in which the ring-shaped groove and the outflow path intersect each other is made larger than the transverse cross-sectional area of the outflow path.

Since the diameter of the outflow path is made larger than the width of the ring-shaped groove and the effective cross-sectional area of the regions of intersection between the ring-shaped groove and the outflow path is made larger than the transverse cross-sectional area of the outflow path, the fluid is not squeezed when it flows from the ring-shaped groove to the outflow path, with the resistance of the flow path decreased. This makes it easy for the fluid to flow all the way from the valve chamber to the outflow path and allows a large quantity of fluid to flow. In other words the Cv value that indicates the ease of flowing of the fluid is increased.

It is desirable that the outflow path runs linearly, such that the outflow path and the ring-shaped groove in the depth-direction form a straight line. This allows fluid from the valve chamber to flow linearly from the ring-shaped groove to the outflow path, such that the flow of fluid in the flow path is very smooth.

The outflow path may be slanted at an acute angle in relation to the depth direction of the groove.

That way, the effective cross-sectional area of the regions in which the ring-shaped groove and the outflow path intersect one another is increased such that the resistance to flow from the ring-shaped groove to the outflow path is decreased.

The aforesaid acute angle is preferably not greater than 45 degrees. This way, the effective cross-sectional area of the regions where the ring-shaped groove 5 and outflow path 7 intersect one another is increased in relation to the transverse cross-sectional area of outflow path 7 without increasing flow path resistance.

The diameter of the outflow path is preferably 1.5 to 2.5 times as large as the width of the ring-shaped groove, such that a substantial decrease in flow path resistance can be expected and it is easy to form an outflow path.

Furthermore, it is desirable that the top portion of the outflow path communicating with the ring-shaped groove is hemispherical in shape, such that flow of fluid from the ring-shaped groove to the outflow path can be made smooth.

It is also desirable that the ring-shaped groove and the outflow path are connected such that the bottom of the ring-shaped groove is located near to the centre of the hemispherical top portion of the outflow path.

Figure 1:
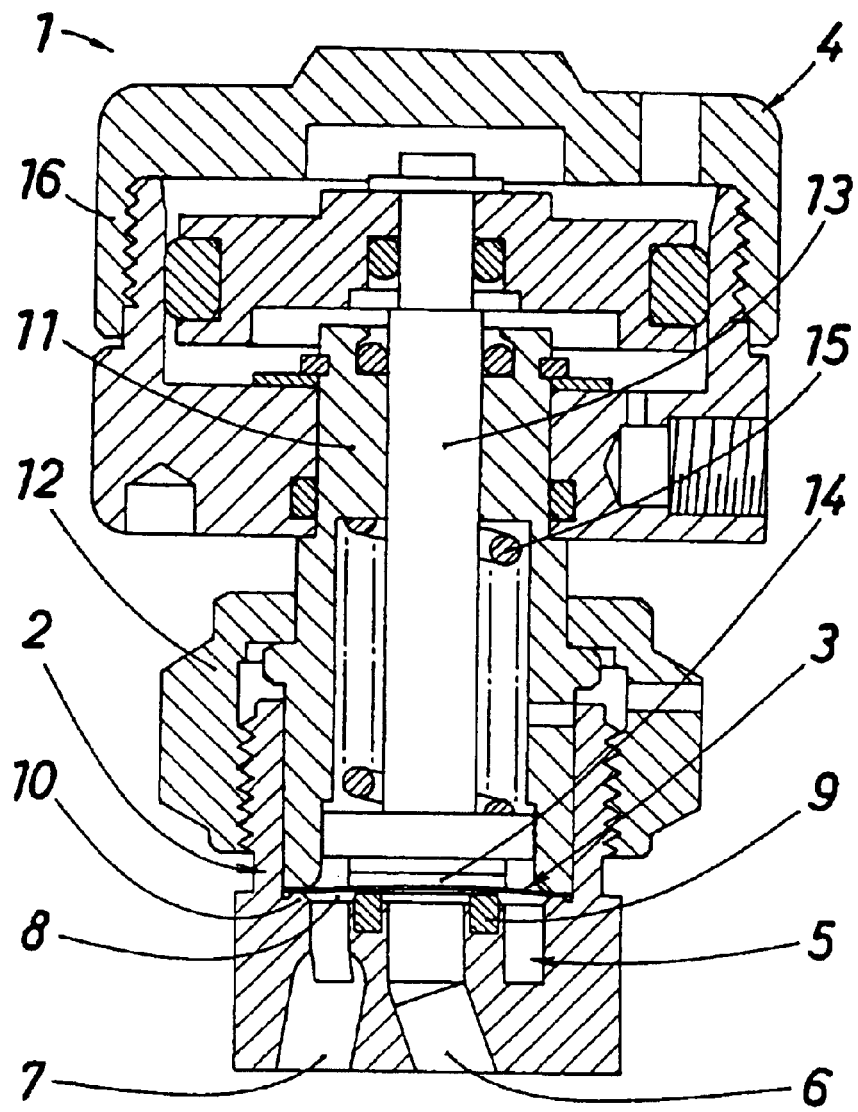
FIG. 1 is a vertical, sectional view of a metal diaphragm valve according to the present invention.

EXPLANATION OF REFERENCE NUMERALS 1 is a metal diaphragm valve; 2, a body; 3, a metal diaphragm; 4, driving means; 5, a ring-shaped groove; 6, an inflow path; 7, an outflow path; 8, a valve chamber; 9, a valve seat; 10, a step section; 11, a bonnet; 12, a bonnet nut; 13, a stem; 14, a diaphragm press; 15, a spring; 16, an air cylinder; D, diameter; W, groove width; θ, acute angle.

DESCRIPTION OF THE PREFERRED EMBODIMENTS

Now, the embodiments will be explained with reference to the drawings.

Figure 2:
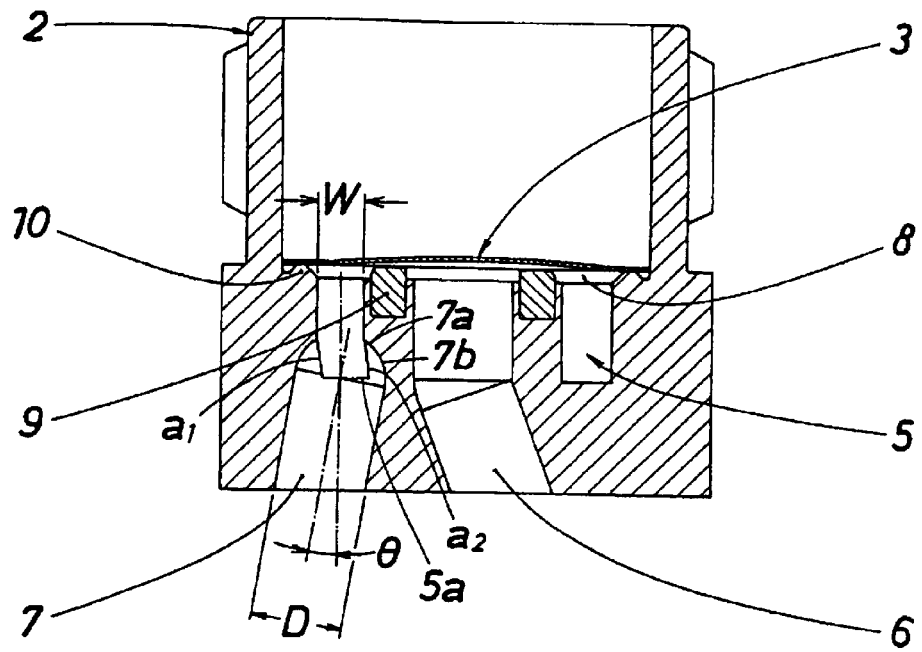
FIG. 2 is an enlarged vertical, sectional view of the body.
Figure 3:
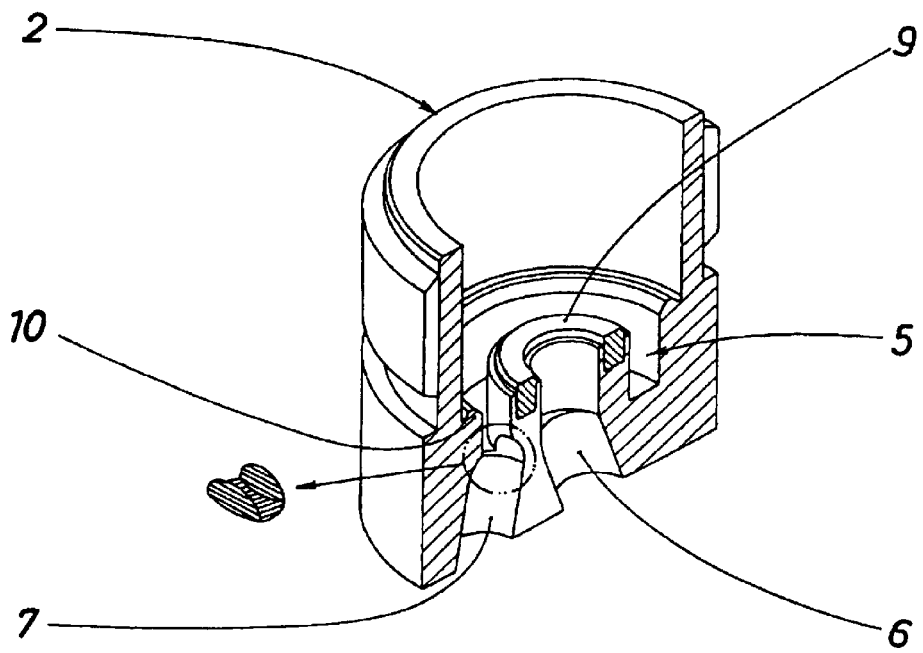
FIG. 3 is a perspective view of FIG. 2.
Figure 4:
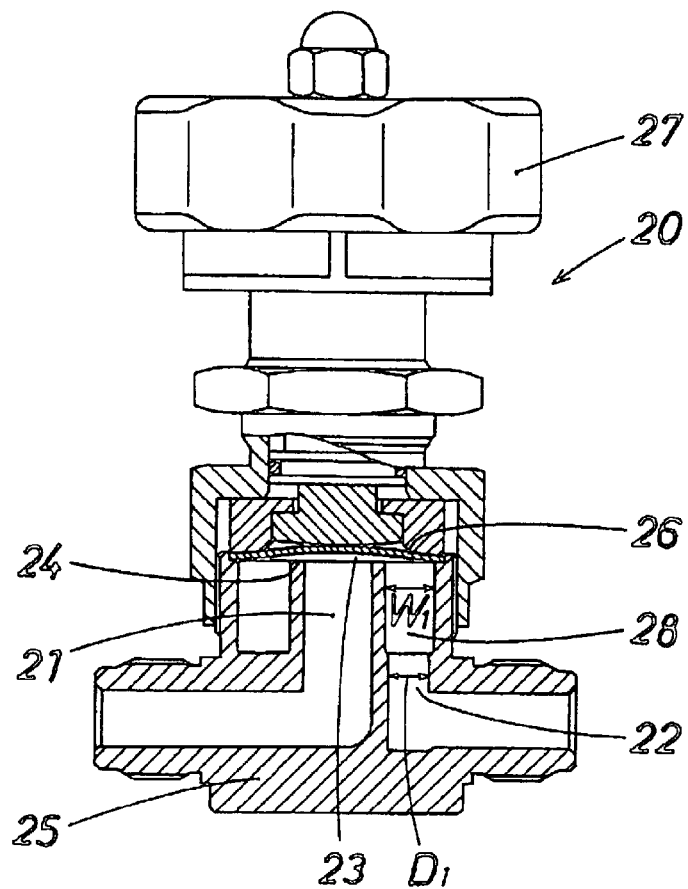
FIG. 4 is a vertical, sectional view of a prior art metal diaphragm valve.
Figure 5:
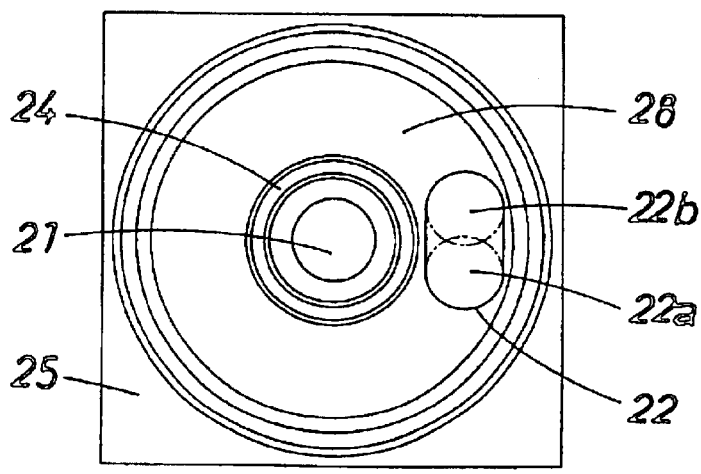
FIG. 5 is a top view of the prior art metal diaphragm valve.

FIG. 1 is a vertical, sectional view of a metal diaphragm valve according to the present invention. FIG. 2 is an enlarged vertical, sectional view of the body. FIG. 3 is a perspective view of FIG. 2.

Referring to FIGS. 1 to 3, the essential part of a metal diaphragm valve 1 comprises a body 2, a metal diaphragm 3, driving means 4 and a ring-shaped groove 5.

The body 2 is provided with a valve seat 9 at a bottom face of a valve chamber 8 communicating with an inflow path 6 and an outflow path 7 and is made of such metal material as stainless steel. The body 2 defines said valve chamber 8 which is concave with an open top, said inflow path 6 which is open upwardly and communicates with said valve chamber 8, said outflow path 7 which is open upwardly and communicates with said valve chamber 8, a valve seat 9 made of a synthetic resin and fitted into the centre of the bottom face of the valve chamber 8 and a step section 10 formed on an outer circumferential surface of the valve chamber 8. Said inflow path 6 and outflow path 7 are circular in section.

The metal diaphragm 3 which is provided in the body 2 in such a way that valve chamber 8 is kept airtight with an upwardly bending central region, is made of an elastic, deformable metal such as stainless steel and has the shape of a dish with its central region bending upwardly. The perimeter of the diaphragm is placed on the step section 10 of the body 2 and is pressed airtightly against said step portion 10 by a lower end portion of a bonnet 11 inserted into the valve chamber 8 and a tapped bonnet nut 12 tightened on the body 2.

The valve is opened or closed as the central region of the metal diaphragm 3 rests on or moves away from the valve seat 8.

The bonnet 11 is formed in a cylindrical shape, inserted in the valve chamber 8 of the body 2 and pressed and held in the body 2 by tightening-up the bonnet nut 12.

The driving means 4 press the metal diaphragm 3 to rest on the valve seat 9 and allow the diaphragm to return by itself to its original shape to move away from valve seat 9. The driving means 4 operate pneumatically and comprise a stem 13 provided in said bonnet 11 and movable up and down, a diaphragm press 14 provided thereunder to press the central region of the metal diaphragm 3, a spring 15 provided between the bonnet 11 and the stem 13 to urge said stem 13 downwards and an air cylinder 16 provided above the bonnet 11 for moving the stem 13 upwards.

The ring-shaped groove 5 is formed below the valve chamber 8 and communicates with the outflow path 7 and is cut out deep under the valve chamber 8 in the shape of a ring to communicate therewith.

The diameter D of the outflow path 7 is made larger than the width W of the ring-shaped groove 5.

The outflow path 7 is so formed that a top face 7a of a hemispherical top is positioned above a bottom face 5a of the ring-shaped groove 5 as shown in FIG. 2. As a result of this, the effective cross-sectional area of the regions of the intersection between ring-shaped groove 5 and the outflow path 7 is made larger than the transverse cross-sectional area of the outflow path 7.

In other words, as shown in FIG. 2, the ring-shaped groove 5 is connected to the outflow path 7 such that the bottom face 5a of the ring-shaped groove 5 is positioned near to the centre of the hemispherical top portion of the outflow path 7.

The effective cross-sectional area of the regions where ring-shaped groove 5 and outflow path 7 intersect each other equals the total of the area of region $a_2$, the area of region $a_1$ and the area of the bottom face region 5a in FIG. 2.

In the embodiment shown in FIGS. 1 to 3, the outflow path 7 is oriented at an acute angle θ in relation to the ring-shaped groove 5. Said acute angle θ is preferably not greater than 45 degrees. In this example, the angle is 18 degrees. If the acute angle θ is larger than 45 degrees, then the angle between ring-shaped groove 5 and the outflow path 7 is large, thus increasing the flow path resistance.

The diameter D of the outflow path 7 is preferably 1.5 to 2.5 times as large as width W of the ring-shaped groove 5. In this embodiment, the diameter D is about twice as large as groove width W. If the diameter D of the outflow path 7 is less than 1.5 times as large as the width W of the ring-shaped groove 5, then the flow path resistance is not expected to decrease greatly. If diameter D of the outflow path 7 is more than 2.5 times as large as the width W, then it is difficult to form the outflow path 7 in manufacture because its relation to the inflow path 6 needs to be considered.

A joint section 7b of the outflow path 7, linking with the ring-shaped groove 5, is formed in the shape of a hemisphere so as to make it smooth for fluid to flow from the ring-shaped groove 5 to the outflow path 7.

Next, the operation of the construction will be explained.

If the force of the air cylinder 16 of said driving means 4 is released, then said spring 15 causes said stem 13 to move downwardly, and said diaphragm press 14 elastically deforms the central region of said metal diaphragm 3 downwardly and presses said diaphragm against the valve seat 9, whereby the valve is closed.

On the other hand, if the air cylinder 16 of the driving means 4 is operated, then the stem 13 and diaphragm press 14 are raised against the spring 15, and the metal diaphragm 3 returns by itself to its original position and moves away from valve seat 9, whereby the valve is opened.

As the diameter D of the outflow path 7 is larger than the width W of the ring-shaped groove 5 and, in addition, the effective cross-sectional area (the surface area of the form shown in hatching in FIG. 3) of the regions where the ring-shaped groove 5 and outflow path 7 intersect one another is made larger than the transverse cross-sectional area (circular) of outflow path 7, the fluid flowing from the ring-shaped groove 5 to the outflow path 7 is not squeezed in the joint section between the ring-shaped groove 5 and the outflow path 7, and the flow path resistance is decreased. The fluid therefore flows easily through the whole flow path from the valve chamber 8 to the outflow path 7 via the ring-shaped groove 5, and a large quantity of fluid is allowed to flow, and Cv value is increased.

EXAMPLE

A metal diaphragm valve 3 was produced to conduct an experiment. The specification of the valve was: 15 mm in diameter of the metal diaphragm 3; 2 mm in the width W of the ring-shaped groove 5; 3.8 mm in the diameter D of the outflow path 7; and 18 degrees in the acute angle of the outflow path 7. The experiment showed that when the flow rate of fluid (a gas) was 50 liters/minute, the pressure loss was 0.239 kg/cm$^2$. When the pressure on the inflow side was 0.1 kg/cm$^2$, the flow rate was 30.9 liters/min., and the Cv value was 0.252. The metal diaphragm valve 1 showed a much smaller pressure loss and a much higher Cv value than the prior art.

In the above example, the outflow path 7 was oriented at an acute angle θ in relation to the ring-shaped groove 5. This is not limiting, and the outflow path 7 may be positioned linearly in relation to the ring-shaped groove 5. That is, the outflow path 7 may run linearly in the same direction as the depth direction of the groove 5.

In the above example, the driving means 4 are of the pneumatic type. This is not limiting, and the driving means 4 may be of the manual type, electromagnetic type, hydraulic type or the like.

EFFECT OF THE INVENTION

As set forth above, the following excellent effects can be achieved according to the present invention.

(1) The metal diaphragm valve comprises a body, a metal diaphragm, driving means and a ring-shaped groove, and, because the diameter of the outflow path is made larger than the width of the ring-shaped groove and the effective cross-sectional area of the regions where the ring-shaped groove and the outflow path intersect one another is made larger than the transverse cross-sectional area of the outflow path, fluid is allowed to flow at a great flow rate through the entire flow path from the valve chamber to the outflow path.

(2) Since the present invention has the following principal features: (a) the diameter of the outflow path is made larger than the width of the ring-shaped groove, and (b) the effective cross-sectional area of the regions where the ring-shaped groove and the outflow path intersect one another is made larger than the transverse cross-sectional area of the outflow path, the present invention is applicable to existing facilities without difficulty, thereby reducing costs.

What is claimed is:

1. A metal diaphragm valve comprising a body with a valve seat provided on a bottom face of a valve chamber communicating with an inflow path and an outflow path, a metal diaphragm with an upwardly bending central region which is provided in the body in such a way that the valve chamber is kept airtight, driving means for pressing the metal diaphragm against the valve seat and allowing the diaphragm to return, by itself, to its original position to move away from the valve seat and a ring-shaped groove formed below the valve chamber and communicating with the outflow path, wherein the diameter of a circular outflow path is larger than the width of said ring-shaped groove, and the effective cross-sectional area of the regions where the ring-shaped groove and the outflow path intersect one another is larger than the transverse cross-sectional area of the outflow path.

2. The metal diaphragm valve of claim 1, wherein the outflow path runs linearly in the depth direction of the ring-shaped groove.

3. The metal diaphragm valve of claim 2, wherein a top portion of the outflow path opening into the ring-shaped grove is hemispherical in shape.

4. The metal diaphragm valve of claim 3, wherein a bottom face of the ring-shaped groove is positioned near the centre of the hemispherical top portion of the outflow path.

5. The metal diaphragm valve of claim 1, wherein the outflow path is oriented at an acute angle in relation to the depth direction of the ring-shaped groove.

6. The metal diaphragm valve of claim 5, wherein a top portion of the outflow path opening into the ring-shaped groove is hemispherical in shape.

* * * * *